United States Patent
Ioannou et al.

(10) Patent No.: US 11,119,855 B2
(45) Date of Patent: Sep. 14, 2021

(54) SELECTIVELY STORING PARITY DATA IN DIFFERENT TYPES OF MEMORY

(71) Applicant: International Business Machines Corporation, Armonk, NY (US)

(72) Inventors: Nikolas Ioannou, Zurich (CH); Timothy Fisher, Cypress, TX (US); Roman Alexander Pletka, Uster (CH); Nikolaos Papandreou, Thalwil (CH); Radu Ioan Stoica, Zurich (CH); Sasa Tomic, Kilchberg (CH); Aaron Daniel Fry, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/663,196

(22) Filed: Oct. 24, 2019

(65) Prior Publication Data

US 2021/0124643 A1 Apr. 29, 2021

(51) Int. Cl.
*G06F 11/10* (2006.01)
*G06F 13/16* (2006.01)
(Continued)

(52) U.S. Cl.
CPC ........ *G06F 11/1076* (2013.01); *G06F 3/0614* (2013.01); *G06F 3/0653* (2013.01);
(Continued)

(58) Field of Classification Search
CPC .. G06F 11/1008; G06F 3/0614; G06F 3/0689; G06F 3/0653; G06F 11/1076; G06F 13/1694; G06F 12/0246
See application file for complete search history.

(56) References Cited

U.S. PATENT DOCUMENTS

| 8,250,286 B2 | 8/2012 | Yeh |
| 8,332,578 B2 | 12/2012 | Frickey, III et al. |

(Continued)

FOREIGN PATENT DOCUMENTS

TW 201907300 A 2/2019

OTHER PUBLICATIONS

Yang et al., "Utilization-Aware Self-Tuning Design for TLC Flash Storage Devices," IEEE Transactions on Very Large Scale Integration (VLSI) Systems, vol. 24, No. 10, Oct. 2016, pp. 3132-3144.

(Continued)

*Primary Examiner* — Guy J Lamarre
(74) *Attorney, Agent, or Firm* — Zilka-Kotab, P.C.

(57) ABSTRACT

A computer-implemented method, according to one embodiment, is for selectively storing parity data in different types of memory which include a higher performance memory and a lower performance memory. The computer-implemented method includes: receiving a write request, and determining whether the write request includes parity data. In response to determining that the write request includes parity data, a determination is made as to whether a write heat of the parity data is in a predetermined range. In response to determining that that write heat of the parity data is in the predetermined range, another determination is made as to whether the parity data has been read since a last time the parity data was updated. Furthermore, in response to determining that the parity data has been read since a last time the parity data was updated, the parity data is stored in the higher performance memory.

20 Claims, 9 Drawing Sheets

(51) Int. Cl.
    *G06F 3/06*         (2006.01)
    *G06F 12/02*     (2006.01)

(52) U.S. Cl.
    CPC ........ *G06F 3/0689* (2013.01); *G06F 11/1008* (2013.01); *G06F 12/0246* (2013.01); *G06F 13/1694* (2013.01)

(56) References Cited

U.S. PATENT DOCUMENTS

| | | | |
|---|---|---|---|
| 8,661,196 | B2 | 2/2014 | Eleftheriou et al. |
| 8,667,219 | B2 | 3/2014 | Eleftheriou et al. |
| 9,021,336 | B1 | 4/2015 | Northcott |
| 9,251,909 | B1 | 2/2016 | Camp et al. |
| 9,779,021 | B2 | 10/2017 | Camp et al. |
| 9,870,285 | B2 | 1/2018 | Camp et al. |
| 10,126,971 | B1 | 11/2018 | Jain et al. |
| 10,977,181 | B2* | 4/2021 | Pletka .............. G06F 12/0871 |
| 2012/0254513 | A1* | 10/2012 | Uehara ................ G06F 3/064 711/103 |
| 2013/0219248 | A1* | 8/2013 | Sakurai ................ G06F 11/10 714/766 |
| 2016/0162359 | A1* | 6/2016 | Kittner ................ G06F 3/0619 714/764 |
| 2016/0224257 | A1* | 8/2016 | Ohno .................. G06F 3/0688 |
| 2017/0046221 | A1* | 2/2017 | Bandic ............... G06F 11/1044 |
| 2019/0266046 | A1* | 8/2019 | Bahirat ............... G06F 11/10 |
| 2020/0050512 | A1* | 2/2020 | Basu ................. G06F 11/1048 |
| 2020/0301768 | A1* | 9/2020 | Papandreou ......... G06F 11/073 |

OTHER PUBLICATIONS

Alsalibi et al., "A survey of techniques for architecting SLC/MLC/TLC hybrid Flash memory-based SSDs," Wiley, Concurrency and Computation Practice and Experience, 2017, pp. 1-21.

Patterson et al., "A Case for Redundant Arrays of Inexpensive Disks (RAID)," Proceedings of the ACM SIGMOD International Conference on Management of Data, Jun. 1988, pp. 109-116.

Pletka et al., U.S. Appl. No. 16/508,140, filed Jul. 10, 2019.

Sudan, K., "Data Placement for Efficient Main Memory Access," A Dissertation submitted to The University of Utah School of Computing, May 2013, 113 pages.

Khan et al., "Improving Cache Performance by Exploiting Read-Write Disparity," University of Virginia Engineering, 2014, pp. 1-12, retrieved from https://www.cs.virginia.edu/~smk9u/khan-rwp-hpca2014.pdf.

Cheng, Y., "Workload-aware Efficient Storage Systems," A Dissertation submitted to the Virginia Polytechnic Institute and State University, Jun. 22, 2017, 152 pages.

IBM, "Optimized Architectures and Methods for Implementing NAND Flash in Storage—NAND Flash as Read Only Cache—as SD-Card in Hybrid Hard Drive—Algorithms to Optimize Read Many Write Few Caching—Method for Analyzing System Characteristics for Optimal NAND Flash/Hard Disk Ratios," IP.com Prior Art Database Technical Disclosure, IPCOM000190167D, Nov. 18, 2009, pp. 1-5.

Anonymous, "Passing information from Host to a Flash System to help improve performance and decrease write amplification," IP.com Prior Art Database Technical Disclosure, IPCOM000236795D, May 16, 2014, pp. 1-2.

Anonymous, "Method and System for Performing Segregation of Data Being Moved during Data Retention of Flash Blocks to Reduce Write Amplification," IP.com Prior Art Database Technical Disclosure, IPCOM000245020D, Feb. 6, 2016, pp. 1-4.

Anonymous, "Method and System for Recovering from Partial Writes on a Storage System Using Log Structured Array," IP.com Prior Art Database Technical Disclosure, IPCOM000248720D, Dec. 29, 2016, pp. 1-5.

Frese et al., "IBM System Storage DS8700 Performance with Easy Tier," IBM Corporation, May 2010, pp. 1-30.

Ioannou et al., U.S. Appl. No. 16/534,834, filed Aug. 7, 2019.

Pletka et al., "Health-Binning: Maximizing the Performance and the Endurance of Consumer-Level NAND Flash," ACM, SYSTOR '16, Jun. 6-8, 2016, 10 pages.

Xu et al., "Flash-Aware Page Replacement Algorithm," Hindawi Publishing Corporation, Mathematical Problems in Engineering, vol. 2014, Article ID 136246, Aug. 12, 2014, pp. 1-11.

Huang et al., "Improving Flash-based Disk Cache with Lazy Adaptive Replacement," IEEE, 2013, 10 pages, retrieved from http://storageconference.us/2013/Papers/2013.Paper.28.pdf.

Fan et al., "Extending SSD Lifespan with Comprehensive Non-Volatile Memory-Based Write Buffers," Journal of Computer Science and Technology, vol. 34, No. 1, Jan. 2019, pp. 113-132.

Yu Hu et al., "Container Marking: Combining Data Placement, Garbage Collection and Wear Levelling for Flash," 19th Annual IEEE/ACM International Symposium on Modeling, Analysis and Simulation of Computer and telecommunication Systems, Jul. 2011, 13 pages, retrieved from https://www.researchgate.net/publication/221082227_Container_Marking_Combining_Data_Placement_Garbage_Collection_and_Wear_Levelling_fpr_Flash.

* cited by examiner

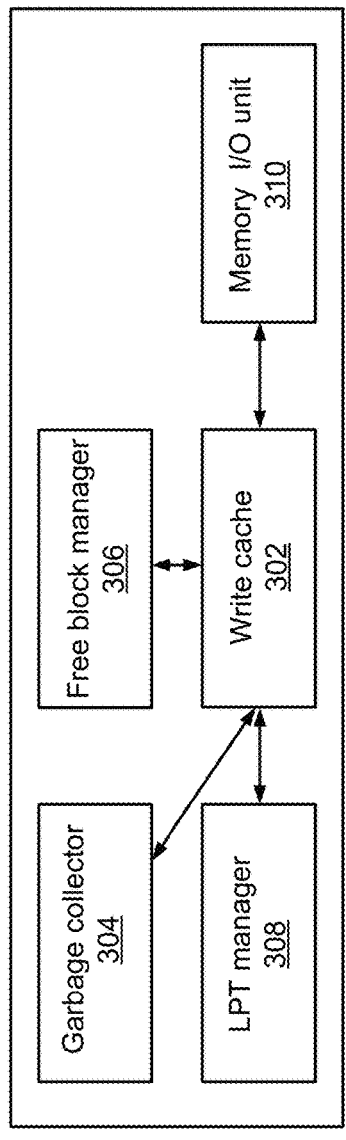
FIG. 3
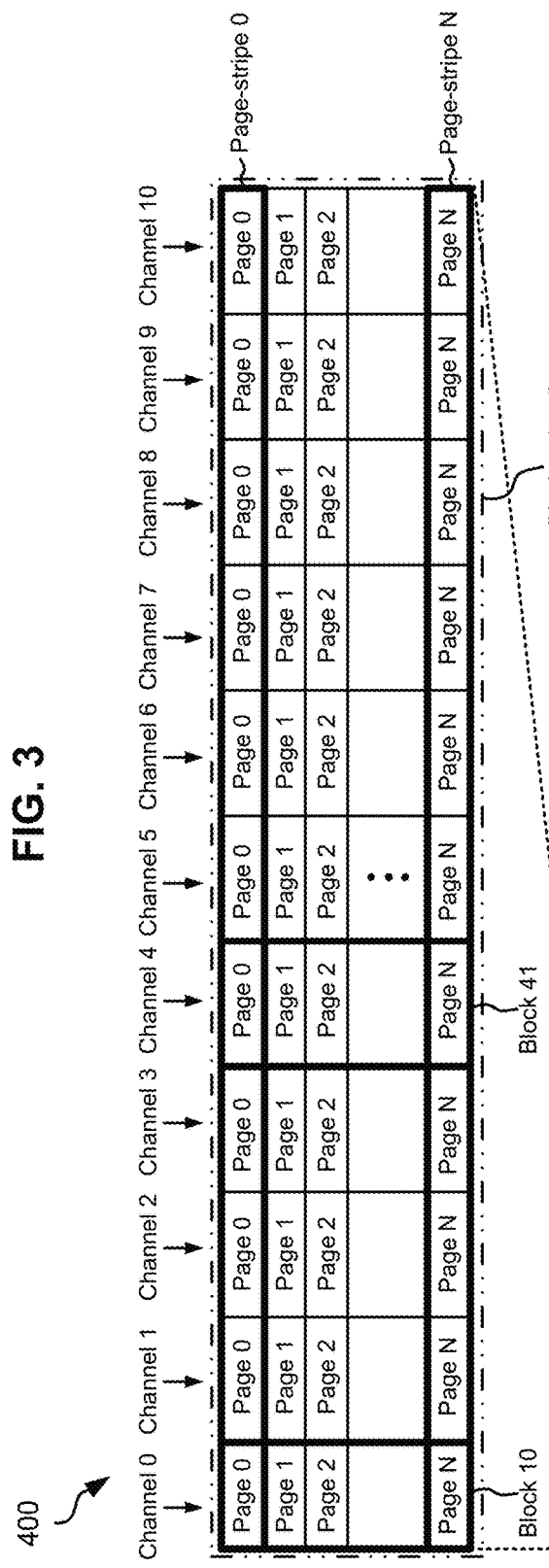
FIG. 4
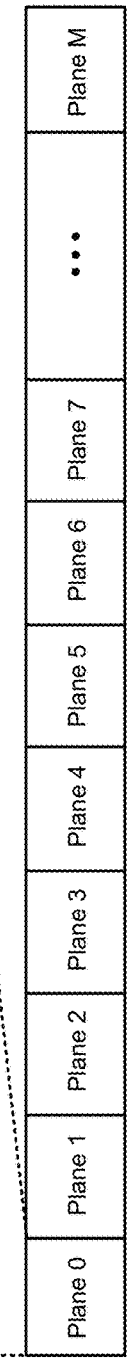

SELECTIVELY STORING PARITY DATA IN DIFFERENT TYPES OF MEMORY

BACKGROUND

The present invention relates to data storage systems, and more particularly, this invention relates to selectively storing parity data in different types of memory having different performance characteristics.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into Redundant Array of Independent Disks (RAID) like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The physical configurations of memory blocks in non-volatile memory have also changed over time. For instance, in the past Flash blocks had a single-bit-per-cell configuration, but improvements in data storage have introduced Flash blocks that implement multi-bit-per-cell configurations. Some Flash blocks also support more than one different physical configuration, e.g., based on their given mode. Moreover, hybrid controllers are capable of managing and/or adapting these blocks which are configured in single-bit-per-cell mode as well as multi-bit-per-cell mode.

SUMMARY

A computer-implemented method, according to one embodiment, is for selectively storing parity data in different types of memory which include a higher performance memory and a lower performance memory. The computer-implemented method includes: receiving a write request, and determining whether the write request includes parity data. In response to determining that the write request includes parity data, a determination is made as to whether a write heat of the parity data is in a predetermined range. In response to determining that that write heat of the parity data is in the predetermined range, another determination is made as to whether the parity data has been read since a last time the parity data was updated. Furthermore, in response to determining that the parity data has been read since a last time the parity data was updated, the parity data is stored in the higher performance memory.

A computer program product, according to another embodiment, is for selectively storing parity data in different types of memory. The computer program product includes a computer readable storage medium having program instructions embodied therewith. Moreover, the program instructions are readable and/or executable by a processor to cause the processor to: perform the foregoing method.

A system, according to yet another embodiment, includes: a plurality of non-volatile random access memory (NVRAM) blocks configured to store data. The system also includes a processor and logic integrated with and/or executable by the processor for selectively storing parity data in different types of memory. The logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
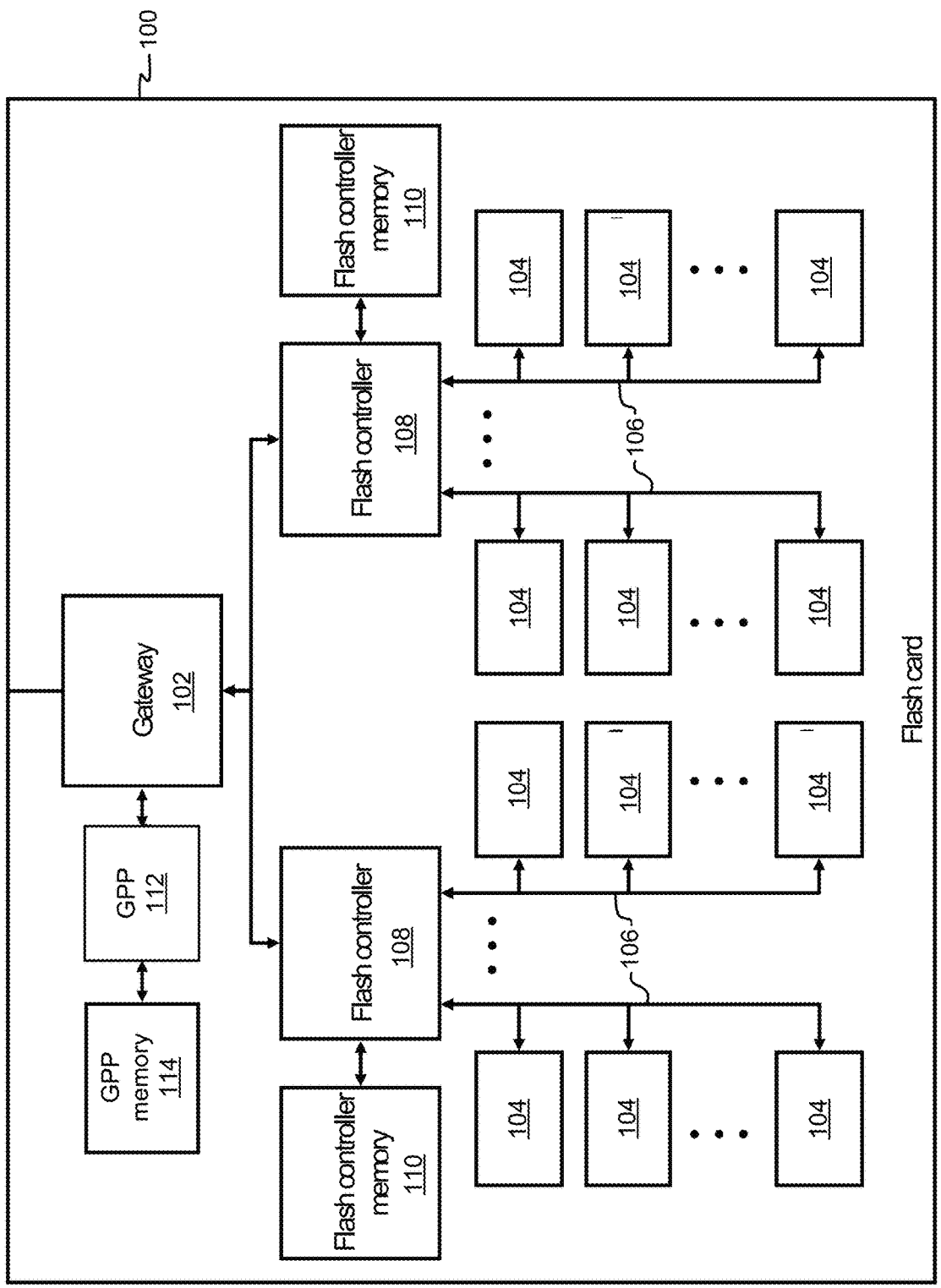
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for selectively storing parity data in different types of memory which include a higher performance memory and a lower performance memory. The computer-implemented method includes: receiving a write request, and determining whether the write request includes parity data. In response to determining that the write request includes parity data, a determination is made as to whether a write heat of the parity data is in a predetermined range. In response to determining that that write heat of the parity data is in the predetermined range, another determination is made as to whether the parity data has been read since a last time the parity data was updated. Furthermore, in response to determining that the parity data has been read since a last time the parity data was updated, the parity data is stored in the higher performance memory.

In another general embodiment, a computer program product is for selectively storing parity data in different types of memory. The computer program product includes a computer readable storage medium having program instructions embodied therewith. Moreover, the program instructions are readable and/or executable by a processor to cause the processor to: perform the foregoing method.

In yet another general embodiment, a system includes: a plurality of non-volatile random access memory (NVRAM) blocks configured to store data. The system also includes a processor and logic integrated with and/or executable by the processor for selectively storing parity data in different types of memory. The logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
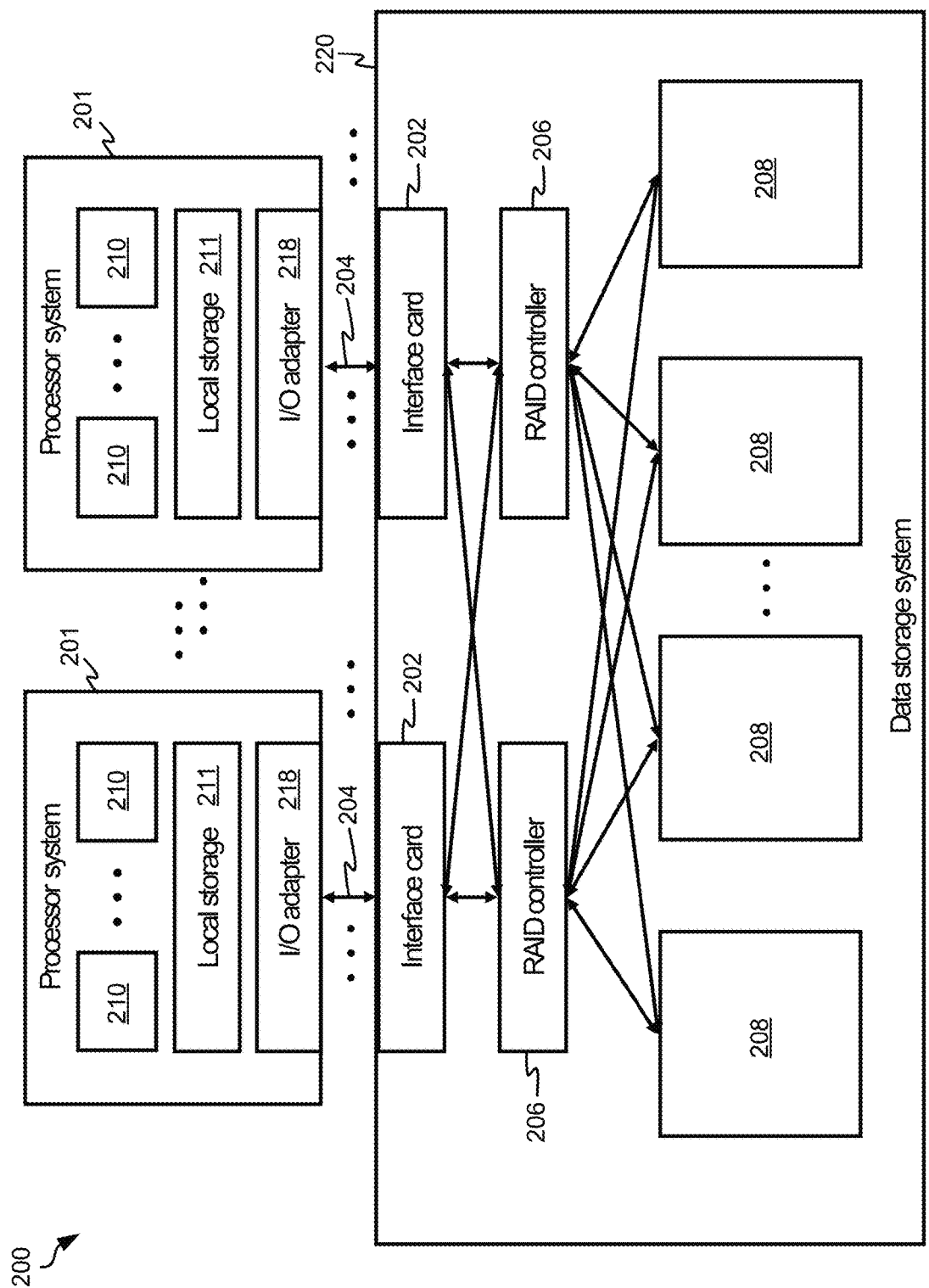
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) and/or GPP 112 may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat separation methods may group hot memory pages together in certain memory blocks while cold memory pages are grouped together in separate memory blocks. Thus, a heat separated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Figure 5:
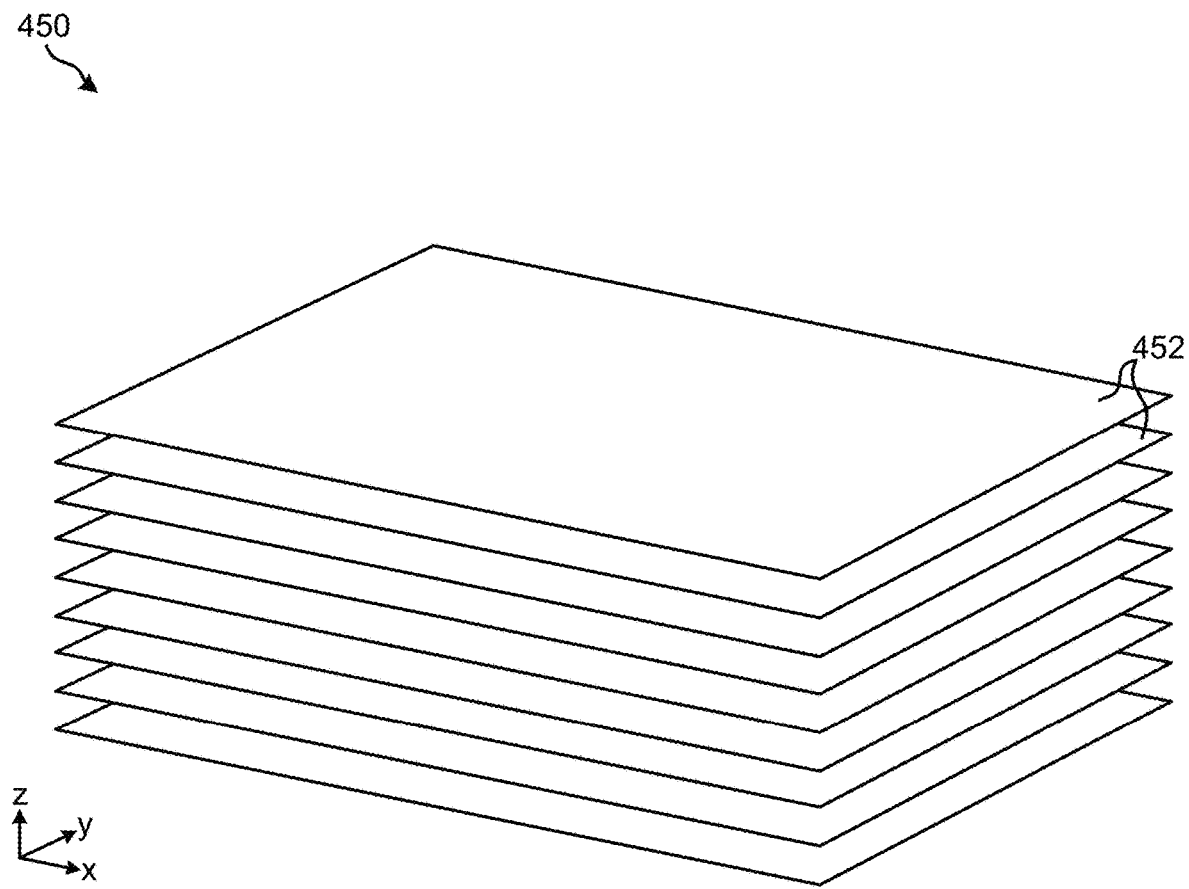
FIG. 5 is a partial perspective view of a 3-D non-volatile memory structure, in accordance with one approach.

The general storage architecture illustrated in the conceptual diagram 400 of FIG. 4 is also implemented by using 3-D memory structures in some approaches. For instance, FIG. 5 depicts a representational view of a 3-D non-volatile memory structure 450, in accordance with one approach. As an option, the present structure 450 may be implemented in conjunction with features from any other approach listed herein, such as those described with reference to the other FIGS., such as FIG. 4. However, such structure 450 and others presented herein may be used in various applications and/or in permutations which may or may not be specifically described in the illustrative approaches listed herein. Further, the structure 450 presented herein may be used in any desired environment. Thus FIG. 5 (and the other FIGS.) may be deemed to include any possible permutation.

As shown, each layer 452 of the 3-D non-volatile memory structure 450 extends along both the x-axis and the y-axis. Each of these layers 452 include a plurality of storage components (not shown), such as voltage supply lines, sensor stacks, transistors, etc., which are used to implement the non-volatile memory devices of the general storage architecture illustrated in the conceptual diagram 400 of FIG. 4, e.g., as would be appreciated by one skilled in the art after reading the present description. Moreover, the various layers 452 are arranged in a stacked fashion along the z-axis in order to increase storage density and efficiency. Cells from different bitlines along a word-line (typically in the x or y dimension of FIG. 5) are logically combined to form pages. Thus, each block includes more than one word-line therein, and each word-line has more than one read voltage associated therewith. For example, in TLC, each word-line in a block contains 3 physical pages (e.g., a lower page, an upper page, and an extra page) and a word-line typically belongs to one particular layer in the z dimension (perpendicular to the x-y plane).

For a particular block, which is formed from a grid of cells connected by word-lines and bit-lines, the number of word-lines residing on the same layer is typically small. Therefore, a block can be formed from word-lines of all layers 452. Moreover, word-lines as well as pages in the same block may reside on different layers 452. It should also be noted that a block includes more than one type of page therein (e.g., upper page, lower page, extra page, top page), and at least one read voltage is associated with each of the page types, e.g., as would be appreciated by one skilled in the art after reading the present description.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of performance latency.

For example, memory blocks having a single-bit-per-cell configuration experience write latencies that are up to about 10 times lower than experienced by memory blocks having multi-bit-per-cell configurations. Similarly, memory blocks having a single-bit-per-cell configuration experience lower read latencies than memory blocks having multi-bit-per-cell configurations. The different types of pages in a block of multi-dimensional non-volatile memory also experience different performance based characteristics. It follows that different types of memory, or even different types of storage components in the same memory, perform significantly differently. Various ones of the embodiments included herein are able to reduce latency and improve throughput by selectively storing parity data in these different types of memory, e.g., as will be described in further detail below.

Figure 6:
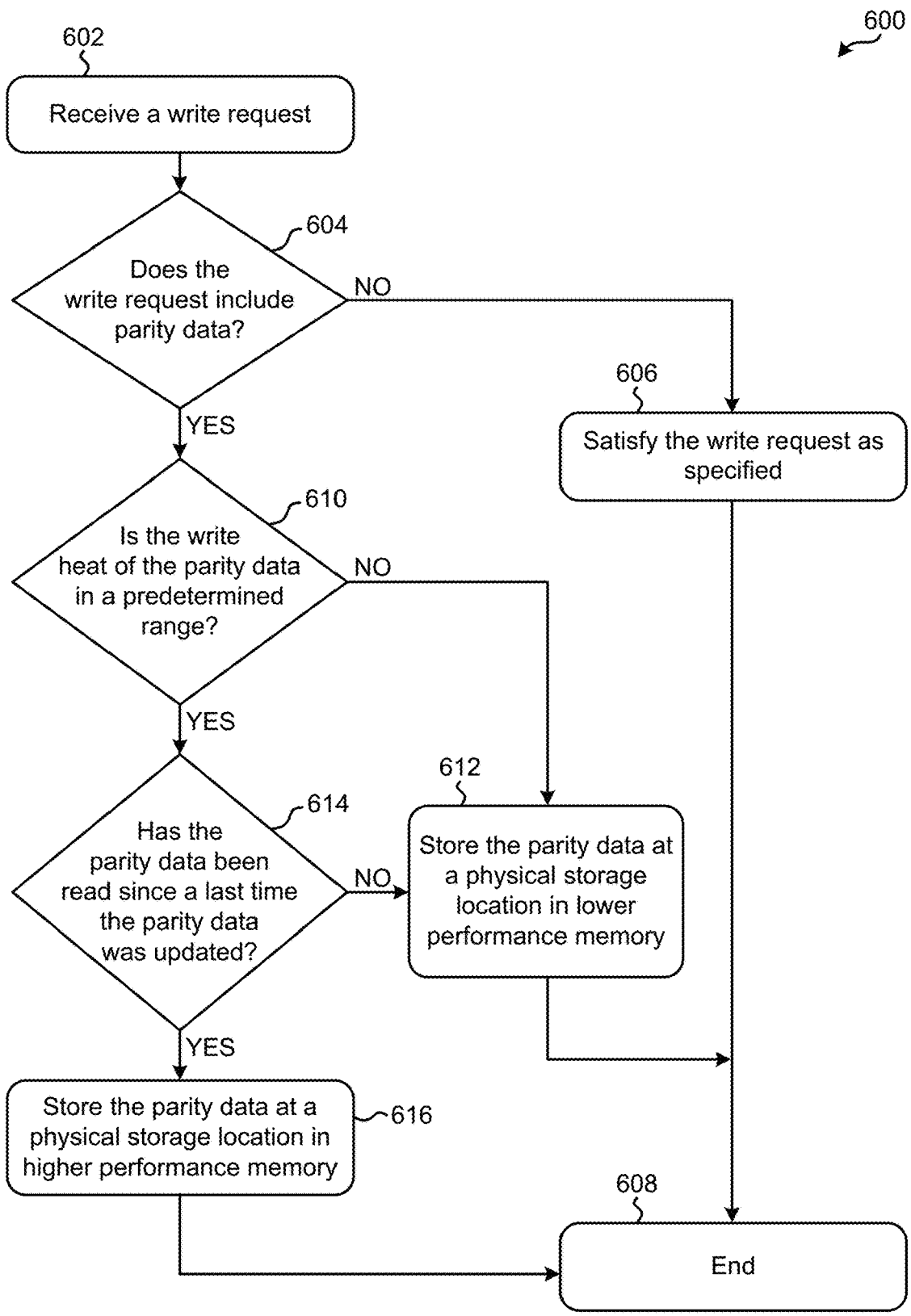
FIG. 6 is a flowchart of a method, in accordance with one embodiment.

Looking now to FIG. 6, a method 600 for selectively storing parity data in different types of memory is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a hybrid controller, a controller, a processor, a computer, etc., or some other device having one or more processors therein. Thus, in some embodiments, method 600 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 600.

Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 of method 600 includes receiving a write request. The write request may be received from a number of different sources depending on the approach. For instance, in some approaches the write request may be received from a user (e.g., a host), while in other approaches the write request may be received from a running application, a remote data storage system, a memory controller (e.g., a RAID controller), etc. It follows that the information that is included in the write request may also vary depending on the situation. While most write requests may include data (e.g., user data) that is intended to be stored in memory, write requests that are received may include other types of information. Information including metadata, parity data, etc., may also be included in some write requests, e.g., as will soon become apparent.

Method 600 further includes determining whether the write request includes parity data. See decision 604. As mentioned above, in some approaches a received write request may include information other than ordinary data (e.g., user data), such as parity data. Identifying requests which involve parity data is desirable in view of the frequency by which parity data is updated in some embodiments. For instance, each partial update to a RAID stripe involves updating the parity data in that stripe. In other words, each time less than the full RAID stripe is rewritten, the parity data which corresponds to that stripe undergoes a read-modify-write operation in which the parity data is read, updated, and finally rewritten. Thus, identifying write requests which include parity data provides an opportunity to selectively store the parity data in a best suited physical storage location, e.g., based on a write heat of the parity data, a frequency at which the parity data is read, etc.

In some approaches, determining whether the write request includes parity data involves simply examining the contents of the write request. The contents may further be compared against existing information in storage in order to distinguish between actual data (e.g., user data) and parity data. However, in preferred approach, write requests which include parity data also include metadata which indicates the parity data is present. In various instances, the metadata may be in the form of one or more flags that indicate the contents of the write request, a packet of information appended to the write request, or any other forms which would be apparent to one skilled in the art after reading the present description.

In response to determining that the write request does not include parity data, method 600 proceeds from decision 604 to operation 606. There, operation 606 includes satisfying the write request as specified. In other words, operation 606 includes nominally performing the write request using any of the processes included herein. According to an example which is in no way intended to limit the invention, the write request involves updating existing data. In such situations, satisfying the write request includes identifying the logical storage location of data which corresponds to the write request update. This logical storage location may further be used to access a LPT to determine the physical storage location of the data being updated, whereby the existing data at the physical storage location may be updated using the data included in the write request. Moreover, heat separation may further be implemented in the process of satisfying the write request as specified, e.g., according to any of the approaches described herein.

From operation 606, the flowchart of FIG. 6 proceeds to operation 608, whereby method 600 may end. However, it should be noted that although method 600 may end upon reaching operation 608, any one or more of the processes included in method 600 may be repeated in order to process additional write requests. In other words, any one or more of the processes included in method 600 may be repeated for subsequently received write requests.

Returning to decision 604, method 600 proceeds to decision 610 in response to determining that the write request does include parity data. There, decision 610 includes determining whether a write heat of the parity data is in a predetermined range. In other words, decision 610 determines the write heat of the parity data and whether it is sufficiently hot to warrant being stored in higher performance memory. By matching the heat of the parity data with the relative performance level of the memory in which the parity data is ultimately stored, the processes described herein are able to significantly reduce the latency of read-modify-write operations thus maintaining efficient performance of the system as a whole while also possibly reducing the amount of read and/or write errors experienced.

The write heat of the parity data may be determined by looking up the frequency by which the parity data has been updated in the past, computing the relevant write heat on the fly, requesting the write heat from another controller and/or the source of the initial write request, etc., depending on the approach. It should be noted that the range may be predetermined by a user, a system administrator, based on industry standards, using component limitations, etc. It should also be noted that "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach.

In response to determining that the write heat of the parity data is not in the predetermined range, method 600 proceeds from decision 610 to operation 612. There, operation 612 includes storing the parity data at a physical storage location in lower performance memory. In other words, the parity data is stored in lower performance memory in response to determining that the parity data has a write heat that is sufficiently low, or equivalently that the parity data is not frequently updated. While lower performance memory experiences a greater amount of latency, less throughput, and/or other less desirable performance characteristics in comparison to the higher performance memory, it may be utilized to store relatively colder parity data without significantly effecting the performance of the system as a whole. For instance, the parity data that is stored in lower performance memory according to method 600 is cold, and therefore will not be accessed as frequently as other parity data which has a higher temperature. It follows that the heat of the parity data is balanced with the performance characteristics in which the parity data is stored, allowing for overall efficiency to be improved.

With respect to the present description, "higher performance memory" is intended to refer to types of memory which perform more favorably at least with respect to "lower performance memory". It follows that the higher performance memory may include any type of memory which exhibits more favorable performance characteristics than other types of memory. While different performance characteristics are desirable depending on the particular situation, according to one example, the two performance levels may correspond to distinguishable latency and/or throughput levels. In some approaches, the higher performance memory includes pages in blocks of NAND Flash that are configured in single-level cell (SLC) mode, while the lower performance memory includes pages in blocks of NAND Flash that are configured in multi-bit-per-cell mode.

As noted above, memory blocks having a single-bit-per-cell configuration (e.g., SLC mode) experience write latencies that are up to about 10 times lower than experienced by memory blocks having multi-bit-per-cell configurations. Similarly, memory blocks having a single-bit-per-cell configuration experience lower read latencies than memory blocks having multi-bit-per-cell configurations. Accordingly, the memory having a SLC configuration is able to read and/or write the parity data with less latency and/or greater throughput than would be achievable for memory having a multi-bit-per-cell configuration. In some approaches a block of memory may be selectively configured in SLC mode or a multi-bit-per-cell mode, thereby resulting in the current configuration of the block to determine whether the parity data should be stored therein, e.g., as would be appreciated by one skilled in the art after reading the present description. Parity data may also be transferred between such blocks of reconfigurable memory as their configurations change over time, e.g., as monitored by a hybrid controller which preferably enables read heat separation. It should also be noted that the blocks configured in multi-bit-per-cell mode may be configured in triple-level cell (TLC) mode, quad-level cell (QLC) mode, penta-level cell (PLC) mode, or any other desirable mode.

Different types of storage components in the same memory may also experience different levels of performance as described herein. For instance, in some approaches the higher performance memory includes lower pages and upper pages in three dimensional (3D) QLC NAND Flash, while the lower performance memory includes extra pages and top pages in the 3D QLC NAND Flash. Thus, parity data (or other types of information) may be selectively stored in certain types of pages in memory depending on the preferred performance.

In still other approaches, the different levels of memory performance may correspond to different types of memory altogether. For instance, in some approaches the higher performance memory includes a SSD, while the lower performance memory includes an HDD. In other approaches the higher performance memory includes a SSD, while the lower performance memory includes a magnetic tape library. In other approaches the higher performance memory includes DRAM memory, while the lower performance memory includes a SSD.

With continued reference to FIG. 6, the flowchart jumps to operation 608 from operation 612 such that method 600 may end as described above. However, returning to decision 610, method 600 proceeds to decision 614 in response to determining that the write heat of the parity data is in the predetermined range. In other words, method 600 proceeds to decision 614 in response to determining that the parity data has a write heat that is sufficiently high, or equivalently that the parity data is frequently updated. Looking to decision 614, a determination is made as to whether the parity data has been read since a last time the parity data was updated. In other words, decision 614 includes determining whether the parity data is read in the context of read-modify-write operations, e.g., as would be appreciated by one skilled in the art after reading the present description. Only parity data that are read between updates are participating in read-modify-write operations and thus significantly affect system performance and are of interest for this approach. Information pertaining to whether the parity data has been read may be stored using one or more bits, a designated region of memory, a dedicated controller, etc., depending on the approach. Thus, decision 614 may be performed by accessing specific information that has been stored.

In response to determining that the parity data has not been read since a last time the parity data was updated, method 600 proceeds to operation 612 such that the parity data is stored at a physical storage location in the lower performance memory, e.g., as described above. Moreover, from operation 612 the flowchart jumps to operation 608 such that method 600 may end.

However, in response to determining that the parity data has been read since a last time the parity data was updated, method 600 proceeds to operation 616. There, operation 616 includes storing the parity data at a physical storage location in higher performance memory. In other words, operation 616 includes using the higher performance memory to satisfy the write request initially received in operation 602. From operation 616, the flowchart also proceeds to operation 608 whereby method 600 may end as described above.

It follows that the various processes included in method 600 are able to perform parity data placement in different types of memory having different performance characteristics. Moreover, RAID protection is also enabled which desirably improves the latency and throughput experienced as a result of read-modify-write RAID operations on partial RAID stripe updates, e.g., as described herein. These improvements are achieved, at least in part, as a result of leveraging the latency and/or throughput differences of different types of memory. Moreover, by identifying write requests which include parity data, keeping track of the write heat of parity data in memory, as well as whether parity data has been read between updates, the approaches herein are able to improve read and write performance.

Figure 7:
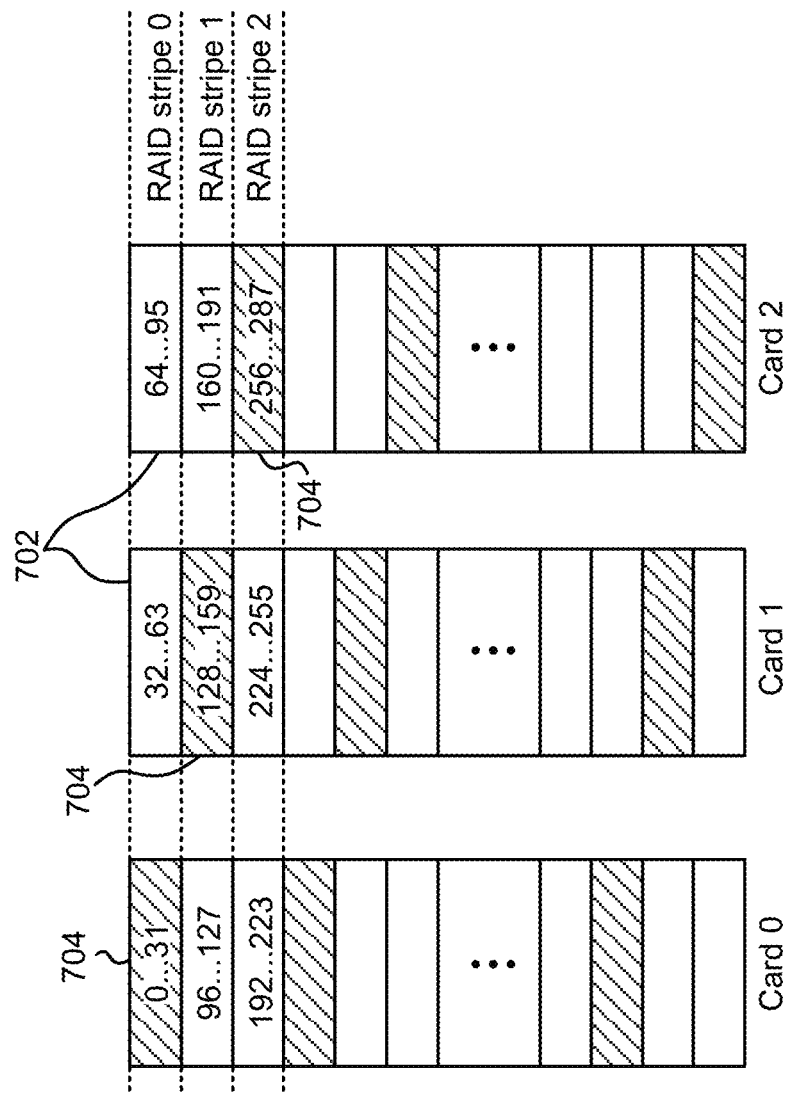
FIG. 7 is a partial representational view of the data distribution in a RAID-5 scheme, in accordance with an in-use example.

As noted above, the approaches included herein may be implemented in order to efficiently store parity data in a RAID stripe. Looking now to FIG. 7, an in-use example of the data distribution in a RAID-5 scheme across NVM cards is illustrated. It should be noted that the in-use example depicted in FIG. 7 is in no way intended to limit the invention. For instance, any of the approaches included herein may be implemented with any desired type of RAID scheme, and/or using any desired type of memory, e.g., as would be appreciated by one skilled in the art after reading the present description.

As shown, the in-use example includes a number of NVM cards Card 0, Card 1, and Card 2. Each of Card 0, Card 1, and Card 2 are used to store user data 702 as well as parity data chunks 704, however an additional card (not shown) may be included which is reserved as spare data storage space which may be used in certain circumstances when needed. Moreover, the user data 702 and parity data 704 are depicted as having been arranged into a number or RAID stripes RAID stripe 0, RAID stripe 1, RAID stripe 2 which span across Card 0, Card 1, and Card 2.

It follows that a received write request having parity data which corresponds to parity data chunk 0 . . . 31 in Card 0 may be evaluated and satisfied using various ones of the processes included in method 600 of FIG. 6 above. Again, non-sequential write performance (e.g., including latency and/or throughput) of RAID array depends on the latency of parity data read-modify-write operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
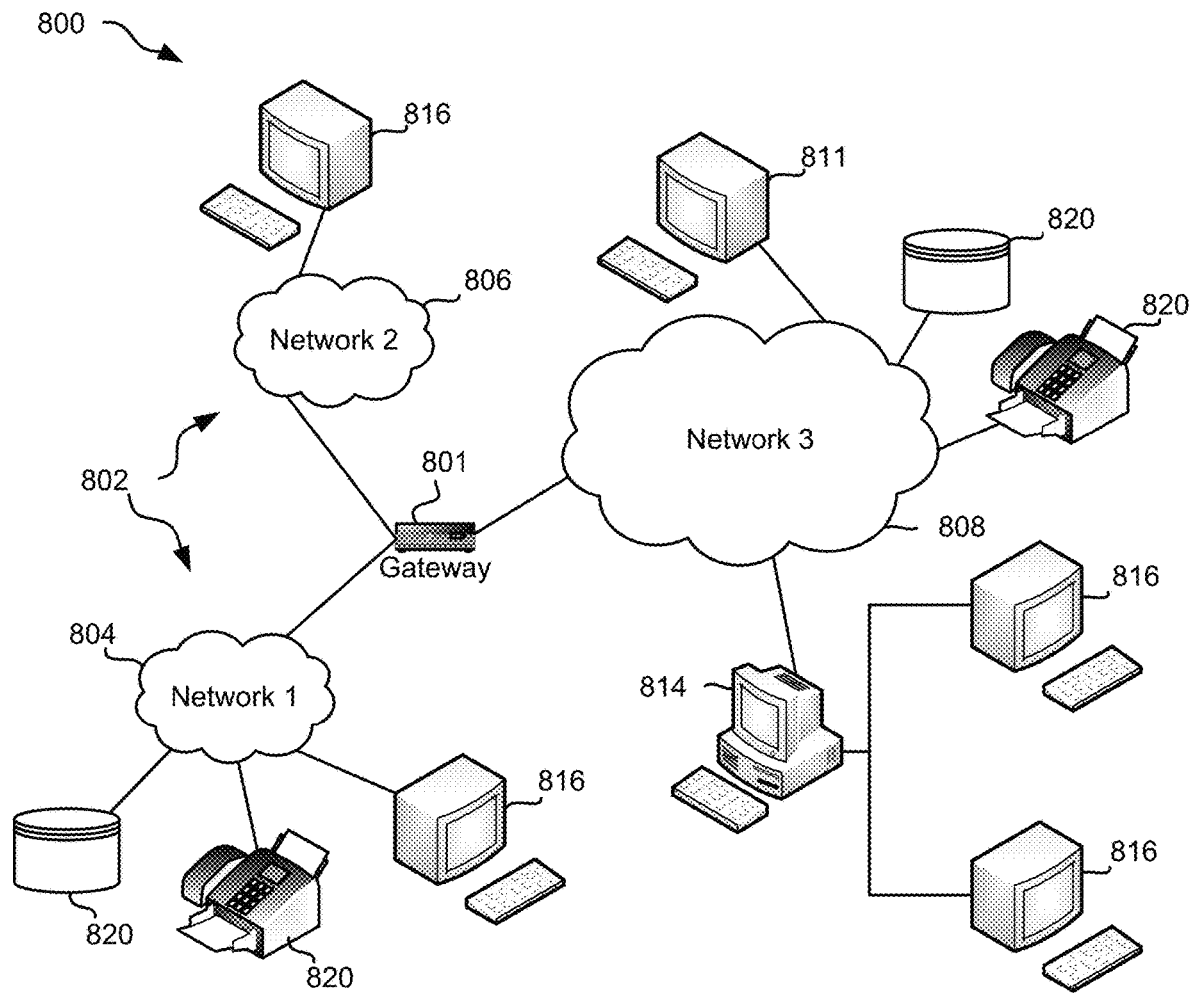
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
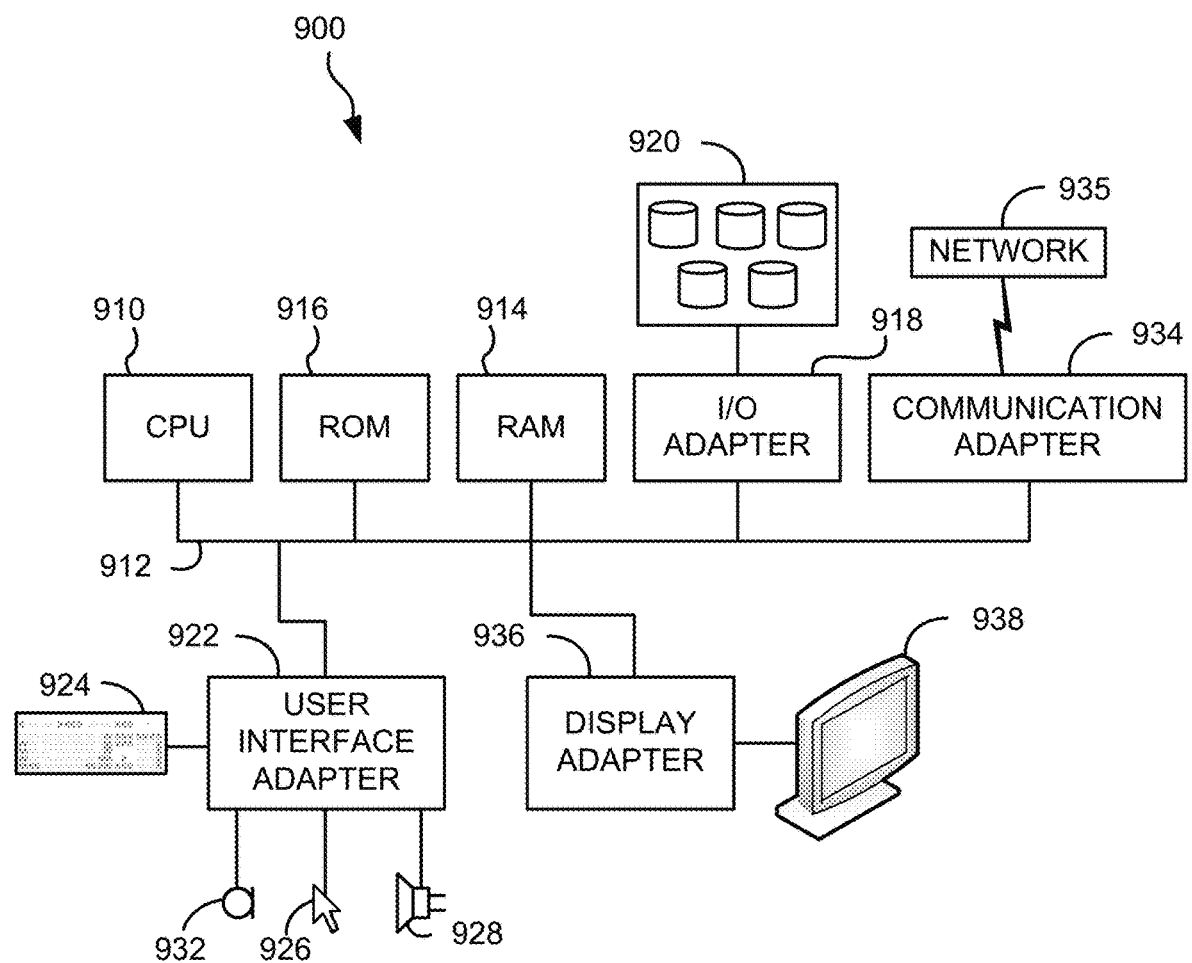
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
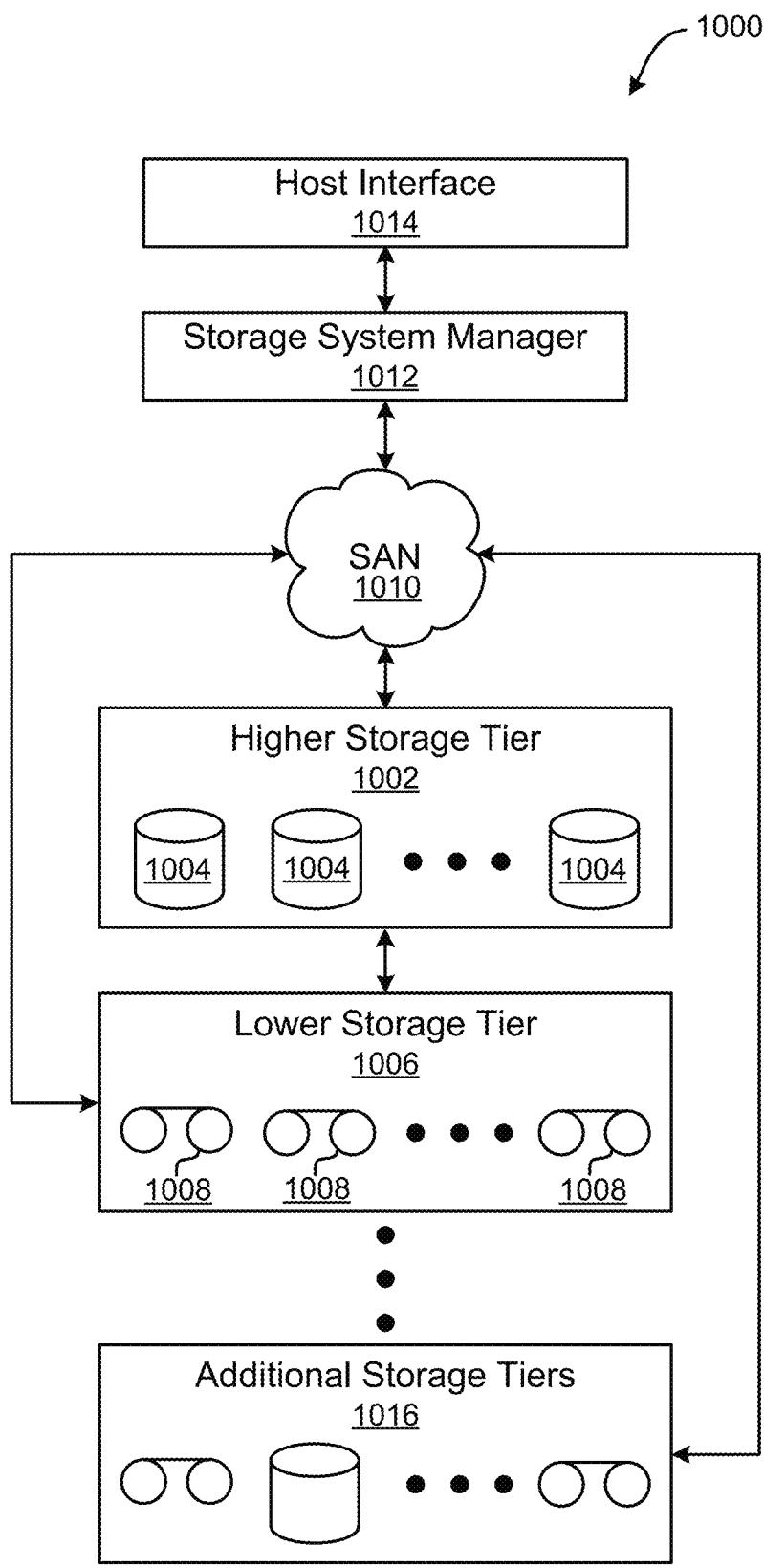
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively storing parity data in different types of memory, comprising:
receiving a write request;
determining whether the write request includes parity data;
in response to determining that the write request includes parity data, determining whether a write heat of the parity data is in a predetermined range;
in response to determining that that write heat of the parity data is in the predetermined range, determining whether the parity data has been read since a last time the parity data was updated; and
in response to determining that the parity data has been read since a last time the parity data was updated, storing the parity data in higher performance memory,
wherein the different types of memory include the higher performance memory and a lower performance memory.

2. The computer-implemented method of claim 1, comprising:
in response to determining that that write heat of the parity data is not in the predetermined range, storing the parity data in the lower performance memory.

3. The computer-implemented method of claim 1, comprising:
in response to determining that the parity data has not been read since a last time the parity data was updated, storing the parity data in the lower performance memory.

4. The computer-implemented method of claim 1, wherein the higher performance memory includes pages in non-volatile random access memory (NVRAM) that are configured in single-level cell (SLC) mode, wherein the lower performance memory includes pages in NVRAM that are configured in multi-bit-per-cell mode.

5. The computer-implemented method of claim 4, wherein the blocks configured in multi-bit-per-cell mode are configured in a multi-bit-per-cell mode selected from the group consisting of: triple-level cell (TLC) mode, quad-level cell (QLC) mode, and penta-level cell (PLC) mode.

6. The computer-implemented method of claim 1, wherein the higher performance memory includes lower pages and upper pages in three dimensional (3D) quad-level cell (QLC) NAND Flash, wherein the lower performance memory includes extra pages and top pages in 3D QLC NAND Flash.

7. The computer-implemented method of claim 1, wherein the parity data is stored in the higher performance memory as a part of a Redundant Array of Independent Disks (RAID) stripe.

8. The computer-implemented method of claim 7, wherein the write request is part of a partial RAID stripe update.

9. A computer program product for selectively storing parity data in different types of memory, the computer program product comprising a computer readable storage medium having program instructions embodied therewith, the program instructions readable and/or executable by a processor to cause the processor to:
  receive, by the processor, a write request;
  determine, by the processor, whether the write request includes parity data;
  in response to determining that the write request includes parity data, determine, by the processor, whether a write heat of the parity data is in a predetermined range;
  in response to determining that that write heat of the parity data is in the predetermined range, determine, by the processor, whether the parity data has been read since a last time the parity data was updated; and
  in response to determining that the parity data has been read since a last time the parity data was updated, store, by the processor, the parity data in higher performance memory,
  wherein the different types of memory include the higher performance memory and a lower performance memory.

10. The computer program product of claim 9, wherein the program instructions are readable and/or executable by the processor to cause the processor to:
  in response to determining that that write heat of the parity data is not in the predetermined range, store, by the processor, the parity data in the lower performance memory.

11. The computer program product of claim 9, wherein the program instructions are readable and/or executable by the processor to cause the processor to:
  in response to determining that the parity data has not been read since a last time the parity data was updated, store, by the processor, the parity data in the lower performance memory.

12. The computer program product of claim 9, wherein the higher performance memory includes pages in non-volatile random access memory (NVRAM) that are configured in single-level cell (SLC) mode, wherein the lower performance memory includes pages in NVRAM that are configured in multi-bit-per-cell mode.

13. The computer program product of claim 12, wherein the blocks configured in multi-bit-per-cell mode are configured in a multi-bit-per-cell mode selected from the group consisting of: triple-level cell (TLC) mode, quad-level cell (QLC) mode, and penta-level cell (PLC) mode.

14. The computer program product of claim 9, wherein the higher performance memory includes lower pages and upper pages in three dimensional (3D) quad-level cell (QLC) NAND Flash, wherein the lower performance memory includes extra pages and top pages in 3D QLC NAND Flash.

15. The computer program product of claim 9, wherein the parity data is stored in the higher performance memory as a part of a Redundant Array of Independent Disks (RAID) stripe.

16. The computer program product of claim 15, wherein the write request is part of a partial RAID stripe update.

17. A system, comprising:
  a plurality of non-volatile random access memory (NVRAM) blocks configured to store data; and
  a processor; and
  logic integrated with and/or executable by the processor for selectively storing parity data in different types of memory, the logic being configured to:
    receive, by the processor, a write request;
    determine, by the processor, whether the write request includes parity data;
    in response to determining that the write request includes parity data, determine, by the processor, whether a write heat of the parity data is in a predetermined range;
    in response to determining that that write heat of the parity data is in the predetermined range, determine, by the processor, whether the parity data has been read since a last time the parity data was updated; and
    in response to determining that the parity data has been read since a last time the parity data was updated, store, by the processor, the parity data in higher performance memory,
    wherein the different types of memory include the higher performance memory and a lower performance memory.

18. The system of claim 17, wherein the program instructions are readable and/or executable by the processor to cause the processor to:
  in response to determining that that write heat of the parity data is not in the predetermined range, store, by the processor, the parity data in the lower performance memory; and
  in response to determining that the parity data has not been read since a last time the parity data was updated, store, by the processor, the parity data in the lower performance memory.

19. The system of claim 17, wherein the higher performance memory includes lower pages and upper pages in three dimensional (3D) quad-level cell (QLC) NAND Flash, wherein the lower performance memory includes extra pages and top pages in 3D QLC NAND Flash.

20. The system of claim 17, wherein the parity data is stored in the higher performance memory as a part of a Redundant Array of Independent Disks (RAID) stripe, wherein the write request is part of a partial RAID stripe update.

* * * * *